No. 661,562.
L. S. STARRETT.
MEASURING GAGE.
(Application filed May 19, 1899.)
Patented Nov. 13, 1900.
(No Model.)
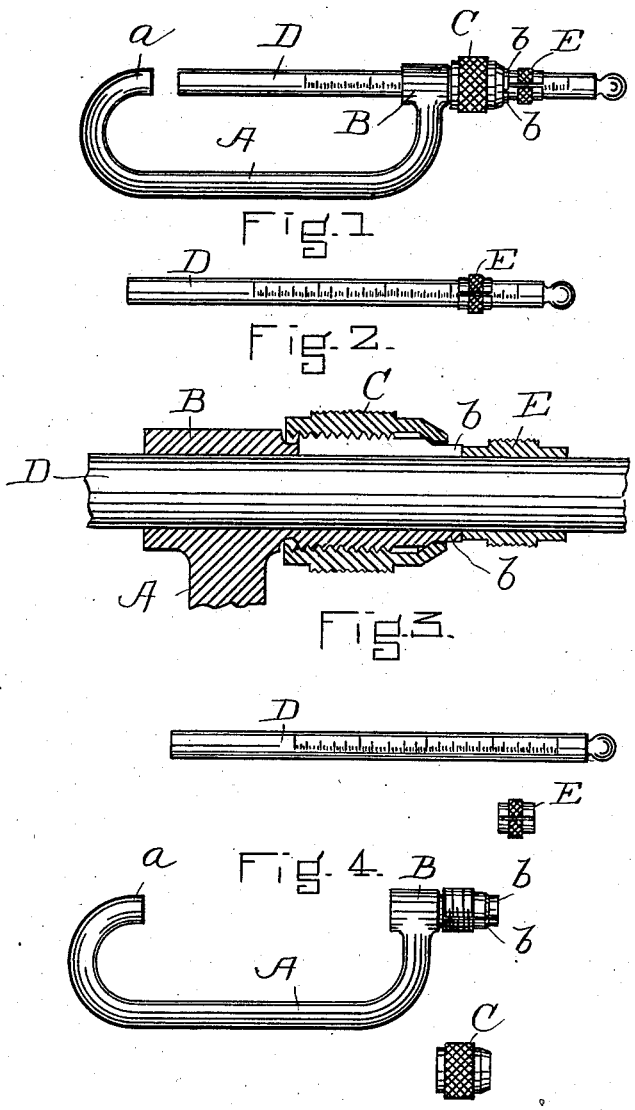

UNITED STATES PATENT OFFICE.

LAROY S. STARRETT, OF ATHOL, MASSACHUSETTS.

MEASURING-GAGE.

SPECIFICATION forming part of Letters Patent No. 661,562, dated November 13, 1900.

Application filed May 19, 1899. Serial No. 717,460. (No model.)

*To all whom it may concern:*

Be it known that I, LAROY S. STARRETT, of Athol, in the county of Worcester and State of Massachusetts, have invented certain new and useful Improvements in Measuring-Gages, of which the following is a specification.

The object of this invention is to provide a measuring-gage especially adapted for use in dark places or upon objects where with the ordinary micrometer-gage the tool cannot be removed from the thing measured without changing the relation of the spindle to the anvil, thereby destroying the record of measurement.

My improved gage complete is composed of four parts—namely, first, the body hooked or recurved at one end to constitute the anvil and having at its opposite end the hollow head slitted terminally and beveled to be compressible upon the spindle and externally threaded to receive the clamp; second, the milled clamping-nut screwing on said head and acting to clamp the spindle; third, the spindle made removable and arranged to slide freely through said head to and away from the anvil when the clamp is slackened and to be held firmly when desired, one or more scales of linear measure being marked on the spindle in fine graduations; fourth, a close-fitting sliding clasp on said spindle, to which it clings by constriction, such clasp being pressed up against the outer end of the slitted head when the spindle calipers the article to be measured, the exact measurement being shown by the graduation-mark on the spindle at the outer end of the clasp. The milled clamping-nut screwing on the hollow head serves to compress its prongs upon the spindle to hold it fast when desired. The clamping devices may, however, be omitted in the simplest form of my invention, since speedy and correct measurements are made by using the graduated spindle and its clasp with the body and hollow head alone.

In the drawings, Figure 1 is a side view of the tool complete, and Fig. 2 a like view of the spindle removed with its sliding clasp. Fig. 3 is an enlarged longitudinal section through the head and adjacent parts, and Fig. 4 a view of the several parts detached.

A is the body of the tool, and B its hollow head, both formed integral, the cylindrical body being bent as shown and its extremity recurved to form the anvil $a$ in the plane of the axis of the head. The head is externally threaded in its middle portion, and its outer end is of reduced diameter and slitted longitudinally to form a series of slender terminal prongs $b$, beveled at or near their extremities.

C is a milled clamping-nut screwing upon the threaded part of the head and reduced in diameter at its outer end, so as to bear on the beveled exterior of the prongs $b$ to press them inwardly when desired to clamp the spindle in position. (See Fig. 3.)

D is the spindle, made straight and unthreaded and fitting to slide freely through the head to bear endwise on the anvil or on any interposed articles to be measured. The spindle has a terminal head and near it one or more finely-graduated scales of linear measure engraved on its sides. A snug-fitting sliding clasp E surrounds the spindle, along which it may be adjusted, such clasp being a short tube or sleeve slotted or split from end to end along one side, so as to cling by constriction and remain in its adjusted position. The clasp has preferably a raised milled central band thicker than its end portions.

The zero-point on the graduated scale is located at a distance from the inner end of the spindle exactly equal to the distance from the bearing face of the anvil $a$ to the outer end of the prongs $b$ of the head plus the length of the clasp E. Hence when the spindle bears against the anvil and the clasp is pushed against the end of the prongs $b$ the outer end of the clasp will coincide with the zero-mark. If now the spindle is retracted and an article to be measured is interposed between the spindle and anvil with proper calipering pressure, the clasp E being pushed in against the end of the head-prongs $b$, the diameter or thickness of the article will be indicated accurately by the graduation-mark at the outer end of the clasp. The spindle and clasp may be removed together from the body and head without disturbing their relative position or interfering with the correctness of measurement indicated on the spindle by the clasp.

The clamping-nut C is not essential to the operation of the tool; but it is often desirable when a correct measurement has been made to fix the parts in that position. Tightening the clamp accomplishes this and also prevents loss of the spindle by dropping out. My gage is the first to make and record measurements by an adjustable clasp on a spindle sliding freely through the head toward the anvil.

I claim as my invention—

1. In a measuring-gage, the body A having at one end the recurved anvil $a$ and at the opposite end the hollow head B, in combination with the graduated spindle capable of a sliding movement through such head and provided with a clinging adjustable clasp to indicate measurements, such clasp being a short tube, longitudinally severed and self-holding by constriction, substantially as set forth.

2. In a measuring-gage, the body, anvil and hollow head, in combination with the removable graduated spindle D fitting within such head, and with the sliding slotted clasp E adapted to cling to the spindle in any adjusted position, the zero-mark of the linear scale being at a distance from the inner end of the spindle exactly equal to the distance from the face of the anvil to the outer end of the head plus the length of said clasp, substantially as set forth.

3. In a measuring-gage, the body A having at one end the anvil $a$ and at the opposite end the hollow head B formed with a threaded central portion and a beveled and reduced outer portion slotted longitudinally to constitute compressible terminal prongs $b$, in combination with the spindle D and slotted clasp E, and with the clamping-nut C engaging the threads of the body and bearing upon the bevel of the prongs to compress them upon the spindle, substantially as set forth.

4. In a measuring instrument, the cylindrical spindle D provided with a line of graduations denoting linear measurements, in combination with the sliding clasp E, milled centrally, slotted longitudinally and clinging internally, by constriction, upon the periphery of said spindle, to maintain its adjusted position, substantially as set forth.

In testimony whereof I have affixed my signature in presence of two witnesses.

LAROY S. STARRETT.

Witnesses:
FRANK E. WING,
WILLARD G. NIMS.